United States Patent
Kast et al.

(10) Patent No.: US 10,914,385 B2
(45) Date of Patent: Feb. 9, 2021

(54) METHOD FOR PREPARING EXTRUDED MATERIAL FOR PROCESSING TO FORM SEALINGS

(71) Applicants: CQLT SAARGUMMI TECHNOLOGIES S.À.R.L., Remich (LU); BMW AG, München (DE); AYTEC AUTOMATION GMBH, Mintraching (DE)

(72) Inventors: Christian Kast, Merzig-Brotdorf (DE); Andreas Hinz, Olching (DE); Christian Ruhland, Sinzing (DE)

(73) Assignees: CQLT SAARGUMMI TECHNOLOGIES S.À.R.L., Remich (LI); BMW AG, Munich (DE)

( * ) Notice: Subject to any disclaimer, the term of this patent is extended or adjusted under 35 U.S.C. 154(b) by 0 days.

(21) Appl. No.: 16/338,191

(22) PCT Filed: Oct. 11, 2017

(86) PCT No.: PCT/EP2017/075889
§ 371 (c)(1),
(2) Date: Mar. 29, 2019

(87) PCT Pub. No.: WO2018/069371
PCT Pub. Date: Apr. 19, 2018

(65) Prior Publication Data
US 2019/0226583 A1    Jul. 25, 2019

(30) Foreign Application Priority Data
Oct. 13, 2016   (DE) .......................... 10 2016 119 520

(51) Int. Cl.
*F16J 15/328* (2016.01)
*B23P 19/04* (2006.01)

(52) U.S. Cl.
CPC .......... *F16J 15/328* (2013.01); *B23P 19/047* (2013.01)

(58) Field of Classification Search
CPC ............................. F16J 15/328; B23P 19/047
See application file for complete search history.

(56) References Cited

U.S. PATENT DOCUMENTS 4,562,102 A * 12/1985 Rabuse ...................... C09J 7/21
                                                              428/43
7,175,898 B2    2/2007 Luehmann
(Continued)

FOREIGN PATENT DOCUMENTS

CA    2381242 A1 *  3/2001   ................ C09J 7/20
DE    10317788 A1   12/2004
(Continued)

OTHER PUBLICATIONS

International Search Report, dated Jan. 30, 2018, 2 Pages.
German Search Report, dated Jul. 5, 2017, 9 Pages.

*Primary Examiner* — Samir Shah
*Assistant Examiner* — Tong Guo
(74) *Attorney, Agent, or Firm* — Lucas & Mercanti, LLP; Klaus P. Stoffel

(57) ABSTRACT

A method for preparing extruded material for processing to form sealings and/or edge protection strips on vehicle bodies, where the extruded material to be prepared, which is substantially of an elastomer substance, includes a covering strip protecting an adhesive layer and extending in the longitudinal direction of the extruded material. The covering strip has sub-sections that are connected to each other on the abutment ends thereof. The covering strips are detached from the adhesive layer and are reconnected to the adhesive layer, optionally in such a way that they are offset to the longitudinal direction of the extruded material. If the offsetting is carried out, the abutment ends of the sub-sections (Continued)

of the covering strip are arranged such that they are offset in relation to the original position thereof on the adhesive layer.

15 Claims, 3 Drawing Sheets

(56) References Cited

U.S. PATENT DOCUMENTS

| | | | |
|---|---|---|---|
| 9,738,145 B2 | 8/2017 | Kast | |
| 9,835,251 B2 | 12/2017 | Kast | |
| 2002/0012761 A1* | 1/2002 | Carlson | C09J 7/29 |
| | | | 428/40.1 |
| 2003/0151212 A1* | 8/2003 | Hahn | B60J 10/34 |
| | | | 277/650 |
| 2013/0117994 A1* | 5/2013 | Fellner | B23P 13/00 |
| | | | 29/428 |
| 2014/0220285 A1* | 8/2014 | Rome | B65H 21/00 |
| | | | 428/41.7 |
| 2017/0082198 A1* | 3/2017 | Kast | B29C 48/022 |

FOREIGN PATENT DOCUMENTS

| | | | | |
|---|---|---|---|---|
| DE | 102005036200 A1 | 3/2006 | | |
| DE | 102005028069 A1 | 5/2006 | | |
| DE | 102014110541 A1 | 1/2016 | | |
| EP | 1733839 A1 | 12/2006 | | |
| WO | 2004108459 A1 | 12/2004 | | |
| WO | 2013167257 A1 | 11/2013 | | |
| WO | WO-2016012073 A1 * | 1/2016 | | F16J 15/102 |

\* cited by examiner

METHOD FOR PREPARING EXTRUDED MATERIAL FOR PROCESSING TO FORM SEALINGS

The present application is a 371 of International application PCT/EP2017/075889, filed Oct. 11, 2017, which claims priority of DE 10 2016 119 520.0, filed Oct. 13, 2016, the priority of these applications is hereby claimed and these applications are incorporated herein by reference.

BACKGROUND OF THE INVENTION

The invention relates to a method for preparing extruded material for processing to form sealings and/or edge protection strips on vehicle bodies, wherein the extruded material to be prepared, which is composed substantially of elastomeric material, has a cover strip which in terms of the length thereof extends in the longitudinal direction of the extrusion and which protects an adhesive layer and is composed of segments which are connected to one another at abutment ends.

The forming of sealings or edge protection strips on vehicle bodies, in particular on vehicle doors, from such continuously fed extruded material is described in EP 1 733 839 A1. In the course of the processing of the extruded material, the cover strip which at the abutment connections between the segments is in each case provided with a connection tab that overlaps the abutment ends to be torn away from the remaining extruded material so as to expose the adhesive layer, wherein high tearing forces, in particular tearing forces that vary in terms of the size thereof, required are very obstructive.

SUMMARY OF THE INVENTION

The invention is based on the object of specifying a new method for preparing extruded material of the type described above, in which method the size of tearing forces required, and/or the bandwidth of variation of the tearing forces, is reduced.

The method according to the invention is characterized in that the cover strip is released from the adhesive layer and is re-connected to the adhesive layer.

By releasing the cover strip and re-connecting the latter to the adhesive layer, changes in the tearing force that arise above all in the region of the abutment location can be significantly reduced.

In one particularly preferred embodiment of the invention the cover strip is re-connected to the adhesive layer by way of an offset in the longitudinal direction of the extrusion, wherein the abutment ends of the segments of the cover strip are disposed so as to be offset in relation to the original position of said abutment ends on the adhesive layer.

The abutment ends of the segments of the cover strip prior to offsetting the latter on the adhesive layer are optionally congruent with abutment ends of segments of the entire extruded material, or only with abutment ends of segments of a double-sided adhesive tape that forms the adhesive layer.

In any case, the offset according to the invention of the abutment ends of segments of the cover strip in particular in relation to abutment ends of the remaining extruded material leads to a reduction in the maxima of the tearing force that arises at connection locations. Such maxima conventionally arise in that adhesive material that is used at the connection locations wets dedicated connection elements between the segments of the cover strip and the adhesive material optionally makes its way between the cover strip and the adhesive layer. On account of the offset according to the invention, adhesive material can reach only up to the uninterrupted internal side of the cover strip that faces the adhesive face, said internal side of the cover strip having a coating which limits the adhesive bond and in the normal case ensures an easy tearing-off capability.

In one further preferred embodiment of the invention the cover strip is released at a release location that is continuous in the longitudinal direction of the extrusion, and is re-connected to the adhesive layer at a connection location at a spacing (L) from the release location, wherein the respective released portion of the cover strip is longer than the spacing (L). On account thereof an offset which corresponds to the difference between the length of the released portion and the spacing between the release location and the connection location results. Alternatively, a portion of the remaining extruded material that is continuously released from the cover strip could have a length that exceeds the length (L), and said extruded material portion could be guided away from the cover strip in a corresponding manner.

In order for the cover strip to be released, the extruded material is preferably moved in the longitudinal direction of the extrusion in a manner relative to a stationary offsetting installation.

The cover strip when released at a release location can be by a guide roller, and at a re-connection location be applied to the adhesive layer by a contact pressure roller, while a portion of the cover strip that is continuously released from the adhesive layer is guided by way of at least one deflection roller that is disposed so as to be spaced apart from the adhesive layer. Guiding installations on which the cover strip slides could be provided instead of the mentioned rollers. A wedge-shaped guiding installation could be considered in particular for releasing the cover strip.

Alternatively to preparing the extruded material in the course of the production thereof, the preparation of the extruded material could also be performed only at the automotive manufacturer and the extruded material could thereafter be fed directly to the processing process.

The adhesive layer can be the body-side adhesive layer of a double-sided adhesive tape. However, connecting the adhesive layer directly to the elastomeric material of the extruded material would also be possible.

In one further design embodiment of the invention the cover strip can be re-connected to the adhesive layer in a length-compressed or elongated state, or optionally so as to be length-compressed and/or elongated in portions.

Elongating or length-compressing the cover strip when being placed on the adhesive layer again is required above all when the cover strip prior to being released from the adhesive layer was connected to the latter in the elongated or length-compressed state.

The invention will be explained further hereunder by means of exemplary embodiments and the appended drawings relating to said exemplary embodiments.

DETAILED DESCRIPTION OF THE INVENTION

Figure 1:
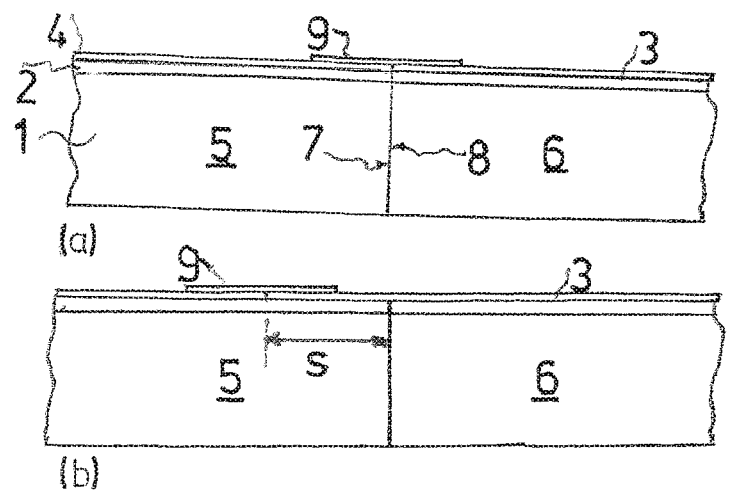
FIG. 1 shows an extruded material portion before and after the preparation according to the invention.

Extruded material shown in FIG. 1 serves for forming sealings and/or edge protection strips on vehicle bodies, wherein the extruded material in the processing process in the course of the vehicle assembly is continuously fed and end pieces that in each case form one sealing and/or edge protection strip are severed according to the assembly cycle.

The extruded material when viewed in the cross section comprises an extruded portion 1 from elastomeric material. The portion 1 has a cross-sectional profile that corresponds to the sealing and/or edge protection function and is connected to a double-sided adhesive tape 2 that in the length thereof extends in the longitudinal direction of the extrusion. An adhesive layer 3 of the double-sided adhesive tape 2 that faces away from the portion 1 from elastomeric material protects a cover strip 4 which in the course of the processing of the extruded material to form sealings and/or edge protection strips is to be removed while exposing the adhesive layer 3.

The extruded material comprises segments of which two segments 5 and 6 of the extruded material portion shown in FIG. 1 mutually abut at ends 7 and 8. Such segments result, for example, in that elastomeric extruded material that in a first preparation step is extruded and continuously connected to the adhesive tape 2 is examined for faulty extruded parts, such extruded parts are severed therefrom, and fault-free segments are connected to one another at ends.

Abutment ends between segments of the cover strip can furthermore also result from the double-sided adhesive tape being inherently composed of segments that are connected to one another at abutment ends. A third possibility lies in that only the cover strip of a double-sided adhesive tape inherently has segments that are connected to one another at abutment ends.

In order for the extruded segments to be connected, the mutually abutting separation cut faces are connected to one another, preferably adhesively bonded to one another. The separation location between the cover strip of the connected segments is additionally provided with a connection tab 9 that overlaps the ends of the strips. The adhesive bonding of the separation cut faces is preferably performed in a hot adhesive-bonding process in which a film disposed between the separation cut faces is brought to melt.

The mentioned first preparation step in which extruded material according to FIG. 1*a* is created, is followed by a further preparation step while forming extruded material according to FIG. 1*b*. The cover strip 4 in this step is released from the remaining extruded material and is re-connected to the remaining extruded material so as to be offset by the distance S.

High values of the releasing force for the cover strip, in particular high peak values, which without the preparation step described would have to be applied when releasing the cover strip 4 in the course of the processing of the extruded material are in particular reduced by the offset.

Figure 2:
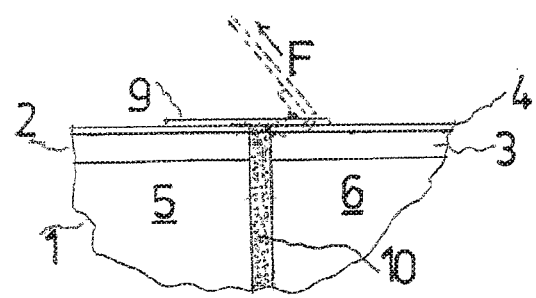
FIG. 2 shows a detailed illustration of the extruded material before the preparation according to the invention.
Figure 5:
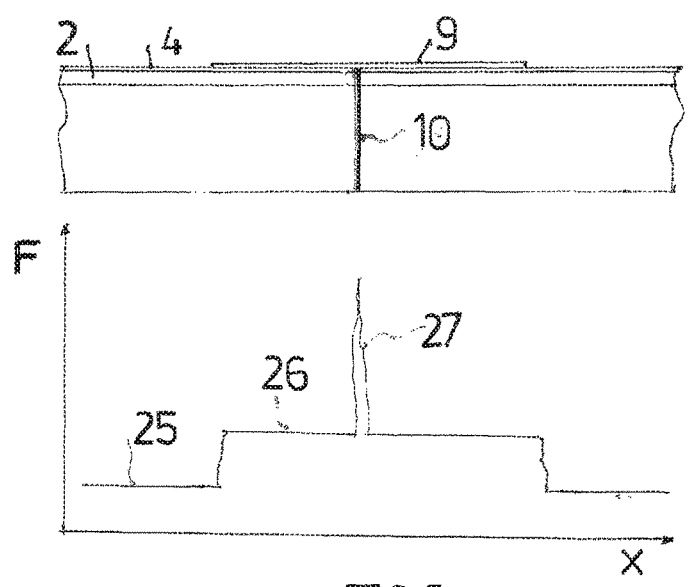
FIG. 5 shows an illustration explaining the functional mode of the invention.

As can be seen in FIG. 2 in conjunction with FIG. 5, changes in the tearing force F would result at the connection locations in that, for example, hot adhesive material 10 there reaches through the cut opening in the cover strip 4 up to the adhesive tab 9 and moreover can laterally ingress between the cover strip 4 and the adhesive layer 3. According to FIG. 5, the tearing force F in relation to a normal level 25 rises to a level 26 when the tearing distance x of the cover strip 4 reaches the connection tab 9. The reason therefor lies in that a solidification of the adhesively-bonded connection between the cover strip 4 and the double-sided adhesive tape 2 is caused on account of welding the connection tab 9 to the ends of the cover strip 4. A sharp maximum 27 of the tearing force F arises at the abutment location, mainly as a result of adhesively bonding the connection tab 9 to the adhesive material 10. The force level 26 and the height of the maximum 27 can be reduced solely by releasing the cover strip 4 and re-connecting the latter by adhesive bonding to the respective adhesive layer of the double-sided adhesive tape 2. Said height of the maximum 27 is even significantly reduced further when the cover strip 4 is re-connected so as to be offset in relation to the previous position thereof in the longitudinal direction of the extrusion.

On account of the further preparation of the extruded material by way of the offset of the cover strip 4, the adhesive material 10 in each case reaches only up to cover strip 4 that is now closed at the respective location, the surface of said cover strip 4 that faces the adhesive layer 3 usually having a coating that reduces the adhesion.

In that the offsetting of the cover strip 4 is performed only after the complete curing of the adhesive material 10, an ingress of adhesive material 10 between the cover strip 4 and the adhesive layer 3 is also largely avoided.

Figure 3:
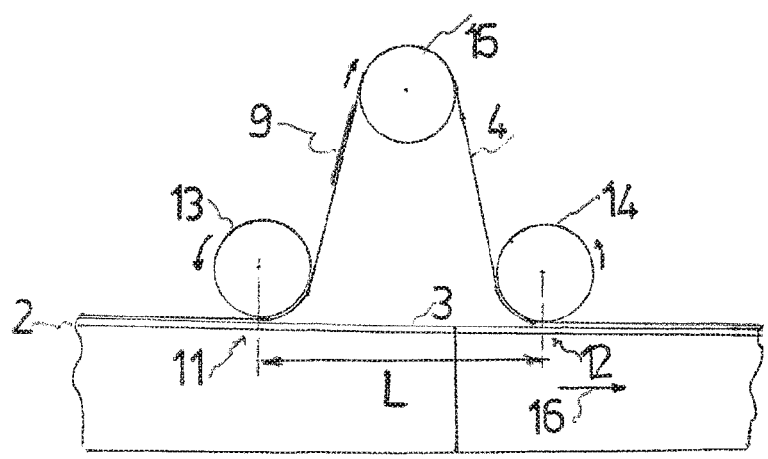
FIGS. 3 and 4 show schematic views of installations for preparing extruded material according to the invention.

The further preparation of the extruded material while releasing the cover strip 4, and re-connecting the latter to the remaining extruded material according to FIG. 3 can be performed in an operating procedure in which a portion of the cover strip 4 is continuously released from the remaining extruded material in the longitudinal direction of the extrusion and is re-connected to the latter. The offset arises in that the respective released length of the cover strip 4 is larger than the distance L in the longitudinal direction of the extrusion between the respective release location 11 and the location 12 of re-connecting.

According to FIG. 3, an offsetting installation can have a guide roller 13 and a contact pressure roller 14. A deflection roller 15 is disposed between the rollers, so as to be spaced apart from the adhesive layer 3. When the extruded material according to arrow 16 is moved through a drive installation (not shown) a release of the cover strip 4 from the adhesive layer 3 arises at the roller 13, while the roller 14, after the released cover strip has been guided around the deflection roller 15, re-connects the cover strip 4 to the adhesive layer 3, The abutment location in the cover strip 4, in relation to the connection location between the segments of the remaining extruded material, is now located in the position S shown in FIG. 1*b*.

Figure 4:
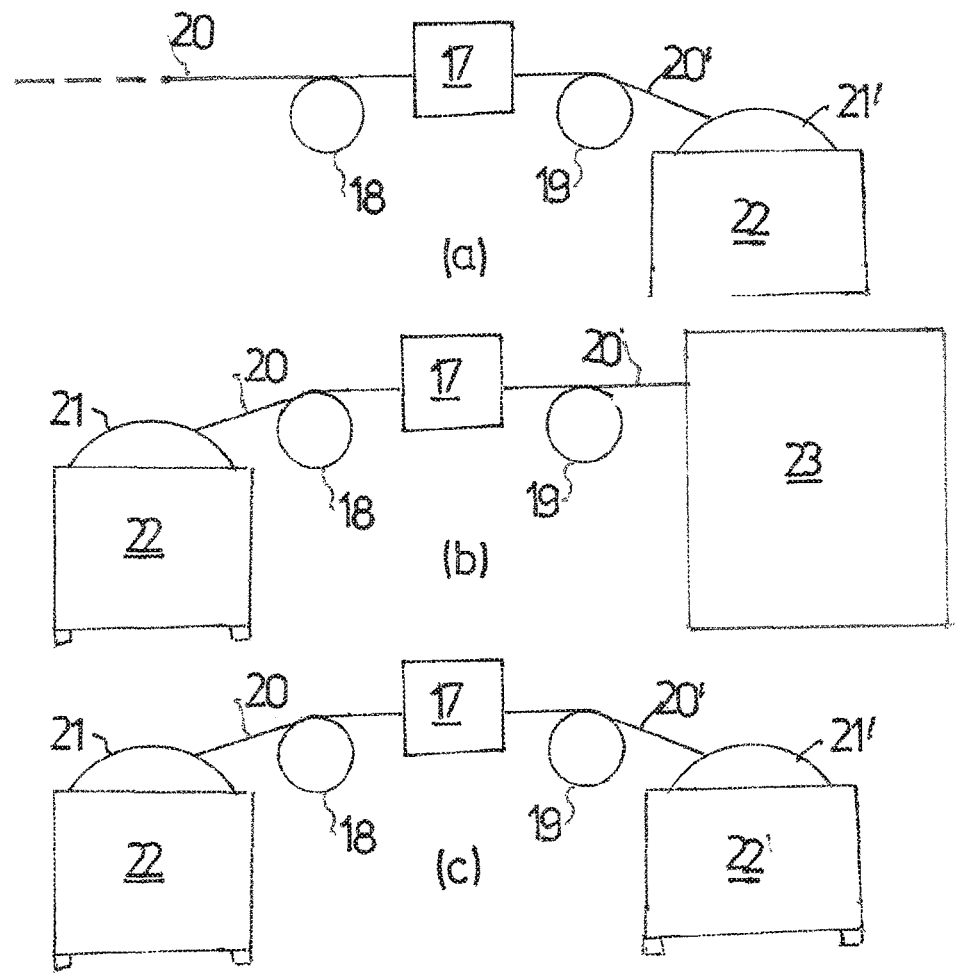

In order for the extruded material to be prepared while offsetting the cover strip 4, the systems shown in FIG. 4 having a schematically illustrated offsetting installation 17 can be utilized, wherein the offsetting installation 17 is configured such as the installation shown in FIG. 3, for example. Rollers 18 and 19 symbolize a transporting and guiding installation which feeds extruded material 20 the offsetting installation 17 and discharges prepared extruded material 20' from the offsetting installation.

According to FIG. 4*a*, extruded material 20 such as is described in FIG. 1*a* is fed from a preparation process that is carried out at the manufacturer of the extruded material. Extruded material 20' that has been processed by the offsetting installation 17 makes its way onto a spool 21 which is rotatably mounted in a transport container 22. The transport container having the spool can be transported to a vehicle manufacturer where the transport container having the spool is used within an application device 23 (FIG. 4b) for forming sealings and/or edge protection strips on vehicle bodies, as is described in EP 1 733 839 A1.

Proceeding from the extruded material according to FIG. 1a, the preparation of extruded material according to FIG. 1b can alternatively be performed at the vehicle manufacturer in that extruded material 20 is unwound from a spool 21, to the offsetting installation 17, and prepared extruded material 20' is fed to the above-mentioned application installation 23, such as is derived from FIG. 4b.

Finally, the offsetting installation 17 according to FIG. 4c could be disposed between two assemblies of identical construction of a spool 21 or 21', respectively, and a transport container 22 or 22', respectively.

Figure 6:
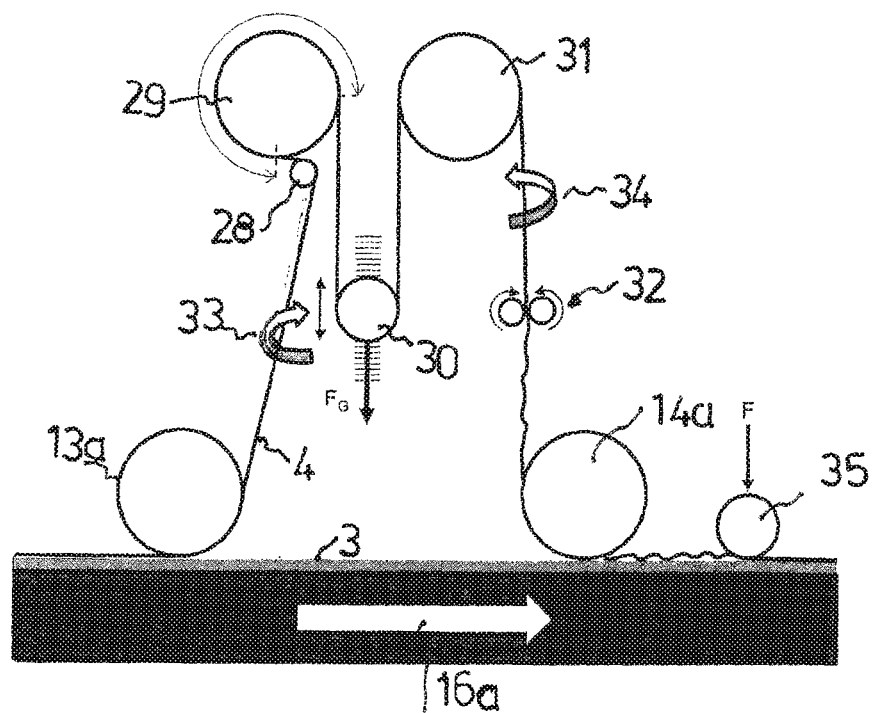
FIGS. 6 and 7 show further installations for preparing extruded material according to the invention.

An installation, shown in FIG. 6, for releasing and re-connecting the cover strip 4 having the adhesive layer 3 protected by the cover strip 4 permits the cover strip 4 to be re-connected to the adhesive layer 3 in a state in which the cover strip 4 is length-compressed in the longitudinal direction of the latter so as to equalize an optionally present increase in length of the cover strip 4.

The installation of FIG. 6 comprises a guide roller 13a which in the movement of the extruded material according to arrow 16a continuously discharges the cover strip 4 from the adhesive layer 3. The torn-off cover strip 4 by way of deflection rollers 28, 29 as well as a buffer roller 30 and by way of a further deflection roller 31 makes its way between two counter-rotating conveyor rollers 32 which engage on the cover strip 4. The cover strip 4 that has been brought to a slack state by the conveyor rollers makes its way from the conveyor rollers 32 to a contact pressure roller 14a that re-connects the cover strip 4 to the adhesive layer 3. A further contact pressure roller 35 is disposed downstream of the contact pressure roller 14a.

Helix installations symbolized by arrows 33 and 34 ensure in each case a rotation of the cover strip 4 by 180°. It is ensured on account of this rotation that only that side of the cover strip 4 that faces away from the adhesive layer 3 comes into contact with the rollers 28 to 31.

The smaller deflection roller 28 that is disposed upstream of the deflection roller 29 ensures a large wrapping angle, in the example shown of approximately 270°. The large wrapping angle ensures that the cover strip 4 is torn off at a constant force by the guide roller 13a. Said large wrapping angle prevents in particular any slippage between the deflection roller 29 and the cover strip 4.

The buffer roller 30 is loaded by a force $F_g$. The conveyor rollers 32 are in a kind of equilibrium with the buffer roller 30 which in this state assumes a specific height position.

Figure 7:
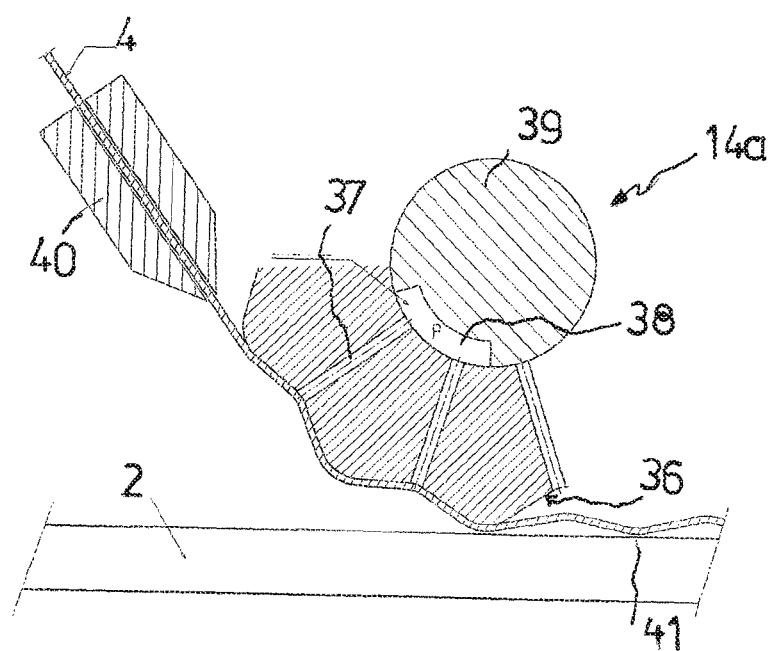

As is derived from FIG. 7, the contact pressure roller 14a is configured as a suction roller and has an undulated shell face 36, suction ducts 37 through which the slack cover strip 4 is suctioned while adapting to the shell face 36 opening out in the troughs of said shell face 36. A guide 40 (not shown FIG. 6) aligns the slack cover strip in a suitable manners A central suction duct 38 in a shaft 39 of the contact pressure roller 14a ensures a vacuum in the respective suction ducts 37.

The cover strip 4 that has optionally been applied in an undulated manner by way of the downstream contact pressure roller 3 is connected to the adhesive layer 3 of the adhesive tape by way of as large a part of the face of said cover strip 4 as possible.

Instead of re-connecting the cover strip to the adhesive tape in the length-compressed state of the cover strip, it would also be possible for the elongation of the cover strip that is inevitable when releasing the latter to be reversed by a heat treatment of the cover strip that causes shrinkage, prior to said cover strip being re-connected to the adhesive tape. To this end, a thermal input into the elongated cover strip is performed by a hot-air jet, for example.

In this case, a heat treatment installation, for example a heat treatment installation that generates a hot-air jet, would have to be disposed upstream of the roller 14 of FIG. 3. Alternatively, the deflection roller 15 could be heated, wherein a reversing installation is expediently disposed upstream and downstream of the roller 15.

It is understood that the roller 14a shown in FIG. 7, in the absence of an elongation or a reversed elongation of the cover strip, could also be used without the surction function like the roller 14 of FIG. 3.

The invention claimed is:

1. A method for preparing extruded material for processing to form sealings and/or edge protection strips on vehicle bodies, wherein the extruded material to be prepared, which is composed of elastomeric material, has a cover strip which in terms of length of the cover strip extends in a longitudinal direction of the extruded material and which protects an adhesive layer and is composed of segments that are adhesively bonded to one another at abutment ends, wherein mutually connected segments of the extruded material are adhesively bonded to one another, the method comprising the steps of:

releasing the cover strip from the adhesive layer; and
re-connecting the cover strip to the adhesive layer by way of an offset in the longitudinal direction of the extruded material, wherein the abutment ends of the segments of the cover strip are disposed so as to be offset in relation to an original position of said abutment ends on the adhesive layer.

2. The method according to claim 1, wherein the abutment ends of the segments of the cover strip prior to being offset are congruent with abutment ends of segments of the extruded material, or only with abutment ends of segments of a double-sided adhesive tape that forms the adhesive layer.

3. The method according to claim 1, including releasing the cover strip at a release location that is continuous in the longitudinal direction of the extruded material, and re-connecting the cover strip to the adhesive layer at a connection location at a spacing from the release location, wherein a respective released portion of the cover strip is larger than the spacing.

4. The method according to claim 1, wherein the extruded material is moved in the longitudinal direction of the extruded material in a manner relative to a stationary offsetting installation.

5. The method according to claim 1, including releasing the cover strip at a release location by a guide roller and re-connecting the cover strip to the adhesive layer at a connection location by a contact pressure roller.

6. The method according to claim 1, guiding a portion of the cover strip that is released from the adhesive layer by at least one deflection roller or sliding installation that is disposed so as to be spaced apart from the adhesive layer.

7. The method according to claim 1, including unwinding the extruded material for preparing from a spool and feeding the prepared extruded material directly to a processing station.

8. The method according to claim 1, including equalizing a length increase of the cover strip arising when releasing the cover strip by re-connecting the cover strip to the adhesive layer in a length-compressed state of the cover strip.

9. The method according to claim 1, including reversing a length increase of the cover strip arising when releasing the cover strip by heat-treating the elongated cover strip prior to the re-connection to the adhesive layer.

10. The method according to claim 9, wherein the heat treatment of the elongated cover strip is performed by a hot-air jet.

11. An extruded material for processing to form sealings and/or edge protection strips on vehicle bodies, wherein the extruded material comprises: a body composed of elastomeric material; an adhesive layer; and a cover strip for protection of the adhesive layer, the cover strip extending, in terms of a length of the cover strip, in a longitudinal direction of the extruded material, the cover strip being composed of segments that are adhesively bonded to one another at abutment ends, wherein the abutment ends of the segments of the cover strip are disposed so as to be offset in relation to abutment ends of mutually connected segments of the extruded material through releasing and re-connecting of the cover strip, wherein the mutually connected segments of the extruded material are adhesively bonded to one another.

12. The extruded material according to claim 11, wherein the segments of the cover strip are connected by connection tabs.

13. The extruded material according to claim 11, wherein the adhesive layer is one of two adhesive layers of a double-sided adhesive tape.

14. The extruded material according to claim 11, wherein the cover strip is length-compressed or shrunk after elongation and re-connected to the adhesive layer.

15. The extruded material according to claim 14, wherein the cover strip is length-compressed and/or shrunk in portions.

* * * * *